Z. E. Sawtelle,

Sash Cord Guide.

No. 103,783. Patented May 31, 1870.

Witnesses:
S. N. Piper
J. R. Snow

Z. E. Sawtelle
by his attorney
R. H. Eddy

United States Patent Office.

ZEPHANIAH E. SAWTELLE, OF BOSTON, MASSACHUSETTS, ASSIGNOR TO HIMSELF AND THOMAS N. STOWELL, OF SAME PLACE.

Letters Patent No. 103,783, dated May 31, 1870.

IMPROVEMENT IN PULLEYS FOR WINDOW-SASH.

The Schedule referred to in these Letters Patent and making part of the same.

*To all persons to whom these presents may come:*

Be it known that I, ZEPHANIAH E. SAWTELLE, of Boston, in the county of Suffolk and State of Massachusetts, have invented a new and useful Improvement in the Manufacture of Window-sash Pulleys; and do hereby declare the same to be fully described in the following specification and represented in the accompanying drawing, of which—

Figure 1:
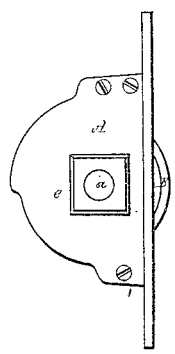
Figure 2:
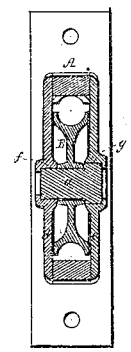
Figure 3:
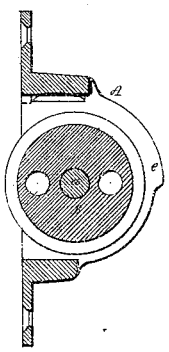

Figure 1 is a side elevation;

Figures 2 and 3, vertical and transverse sections; and

Figure 4:

Figure 4, a rear elevation of my improved sash-pulley.

Figure 5:

Figure 5 is a side view of its glass spindle or pivot.

Such pulleys as usually constructed have either steel or iron pivots or spindles. Those of steel are costly, and, like the iron ones, are liable to become rusted and to run with much friction.

In carrying out my invention, I employ a spindle, $a$, of glass, and make it with a prismatic head, $b$, and I form each of the side plates, $d\ e$, of the roller-case A with sockets $f\ g$, to receive the ends of the spindle and project more or less across them.

In the drawing, the roller or sheave is shown at B, as encircling the glass spindle.

The prismatic head of the spindle and its socket prevent the spindle from revolving with the wheel, and the extension of the sockets down by the ends of the spindle holds the spindle from working endwise or out of place.

The sash-pulley with the glass spindle will cost less than one with a steel spindle, and is far preferable.

The wheel will run with less friction and wear.

I claim—

As a new or improved manufacture, the sash-pulley having its spindle of glass and made as described, when the case is formed with sockets to receive the ends of the spindle and project more or less across them, substantially in manner and for the purpose or purposes as explained.

Z. E. SAWTELLE.

Witnesses:
R. H. EDDY,
J. R. SNOW.